No. 872,716. PATENTED DEC. 3, 1907.
M. COOK, Jr.
SOLE CHANNELING TOOL.
APPLICATION FILED MAY 20, 1907.
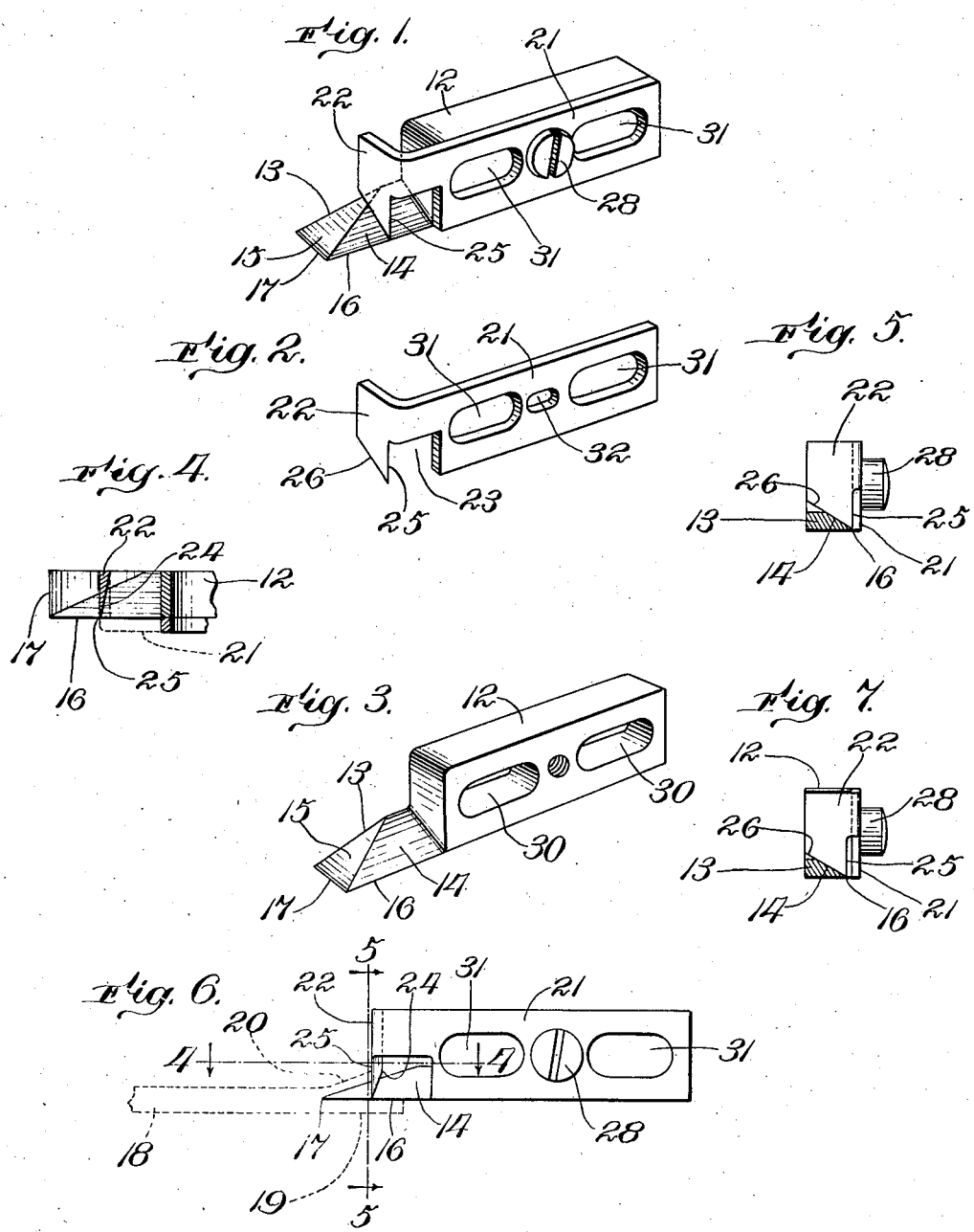

UNITED STATES PATENT OFFICE.

MILLER COOK, JR., OF WHITMAN, MASSACHUSETTS.

SOLE-CHANNELING TOOL.

No. 872,716.  Specification of Letters Patent.  Patented Dec. 3, 1907.

Application filed May 20, 1907. Serial No. 374,600.

*To all whom it may concern:*

Be it known that I, MILLER COOK, Jr., of Whitman, in the county of Plymouth and State of Massachusetts, have invented certain new and useful Improvements in Sole-Channeling Tools, of which the following is a specification.

This invention relates to tools or appliances for slitting the edge of an inner sole to form a lip adapted to be turned upwardly from the lower or outer surface of the inner sole of a welted shoe.

The invention has especial reference to two-part tools of this character, adapted not only to cut the slit or channel which forms the lip, but also to trim off surplus portions of the lip, especially at the shank portion of the sole.

The invention has for its object to provide a tool embodying two associated knives, one, which I term the slitting knife, adapted to slit the edge of the sole to form the lip, while the other, which I term the trimming knife, is adapted to trim off the outer edge of the lip at portions of the sole where said lip is of maximum width, owing to increased depth of penetration of the slitting knife into the edge of the sole, the tool being characterized by a peculiar construction of the trimming knife, whereby the durability and effectiveness of the latter are greatly increased, and the cost of the tool as a whole is reduced.

The invention consists in the improvements which I will now proceed to describe and claim.

Of the accompanying drawings, forming a part of this specification,—Figure 1 represents a perspective view of a tool embodying my invention. Fig. 2 represents a perspective view of the trimming knife. Fig. 3 represents a perspective view of the channeling knife. Fig. 4 represents a section on line 4—4 of Fig. 6. Fig. 5 represents a section on line 5—5 of Fig. 6. Fig. 6 represents a side elevation of the tool, showing in dotted lines a portion of an inner sole being acted on thereby. Fig. 7 represents a view similar to Fig. 5, showing the effect of the wear and grinding on the blades. All the figures of the drawing are shown on an enlarged scale.

The same letters of reference indicate the same parts in all the figures.

The slitting knife is composed of a shank 12, having at one end a thin extension 13 which forms the cutting blade, said blade having two beveled faces 14 and 15, which intersect the bottom surface of the blade, and form a side cutting edge 16 and an end cutting edge 17. The slitting knife thus formed is adapted to enter the edge of an inner sole 18, shown by dotted lines in Fig. 6, and subdivide the edge of the inner sole to form the usual feather 19 and lip 20.

The trimming knife is composed of a shank 21 formed to bear on one side of the shank 12, and a blade or knife portion 22 bent at right angles to the shank portion, and formed to overhang the slitting blade. The said shank and blade are formed by bending a single piece of metal of suitable thickness to form two arms of unequal length at right angles with each other, one arm constituting the shank and the other arm the blade. This construction provides a trimming knife 22 having a maximum strength and providing a large amount of stock which may be ground down, so that the said trimming knife may possess a period of wear and usefulness of as great a length as that of the slitting blade. As clearly shown in the drawings, the length of the shorter arm or blade 22, in a direction transverse of the slitting knife, exceeds the thickness of the longer arm or shank 21, this being due to the bending at a right angle as described. The lower edge of the shank 21 is cut away to form a recess 23. The blade 22 projects below the portion of the shank which is located above the recess 23, the said projecting portion having a beveled face 24 on its inner side, which intersects the outer side of the blade, and forms a cutting edge 25 which extends from the shank portion to the cutting edge 16 of the slitting knife, and is arranged substantially at right angles with said cutting edge 16. The trimming blade 22 has an inclined lower end 26, the inclination of which corresponds to that of the face 14 of the slitting blade, the end 26 bearing closely upon the face 14, as shown in Figs. 1 and 5.

It will be seen, by reference to Fig. 4, that the distance between the cutting edge and the heel or back of the trimming blade 22 is substantially equal to the distance between the cutting edge 16 and the heel or back of the slitting blade, hence the trimming blade is adapted to be reduced, by grinding, to the same extent that the slitting blade is adapted to be reduced. This result is due to the bending of the trimming blade to a position at right angles to its shank, so that the trimming blade is caused to overhang the slitting blade, and is given a width practically equal to that of the slitting blade, so that the two blades have a practically equal period of wear and usefulness.

Fig. 7 shows the condition of the blades after they have been considerably reduced by wear and grinding. It will be seen that the recession of the cutting edge 16 of the slitting blade by grinding involves a downward movement of the trimming blade, in order that the lower end of its cutting edge may meet the cutting edge 16 of the slitting blade. This adjustment is provided for by connecting the shanks of the two blades by means of a single pivot screw 28, which permits the shank of the trimming blade to swing sufficiently to depress the said trimming blade from time to time, and keep the lower end of its cutting edge in contact with the slitting blade. To prevent the rotation of the screw 28 from raising the trimming blade, I prefer to make said screw with a left-hand thread, so that when it is tightened, it will be rotated in such direction that its frictional contact with the shank of the trimming blade will tend to force the trimming blade downwardly against the slitting blade.

The shanks 12 and 21 are provided respectively with longitudinal slots 30 31 which receive the screws attaching the tool to the frame of the machine, said slots permitting longitudinal adjustment of the knives. The shank 21 of the trimming knife has a longitudinal slot 32 through which the screw 28 passes, said slot permitting independent adjustments of the two knives to maintain the desired distance between the edge 25 of the trimming and the edge 17 of the slitting knife. When the edge 17 is worn back toward the shank, the edge 25 is correspondingly adjusted to compensate for the wear.

I claim:

1. In a sole-channeling tool, in combination, a slitting knife composed of a shank and a thin extension formed as a blade at one end of the shank, and a trimming knife composed of two arms of unequal length arranged substantially at right angles with each other, the longer arm constituting the shank, and the shorter arm the blade of the trimming knife, said blade overhanging the slitting blade, and having a cutting edge substantially at right angles with the cutting edge of the slitting blade, the length of the shorter arm in a direction transverse of the slitting knife exceeding the thickness of the longer arm or shank, the said shanks being adjustably connected to permit an adjustment of the trimming blade toward the slitting blade.

2. In a sole-channeling tool, in combination, a slitting knife composed of a shank and a thin blade extension at one end of the shank provided with a beveled face 14, which intersects the bottom surface of the blade, and forms a cutting edge, and a trimming knife composed of two arms of unequal length, arranged substantially at right angles with each other, the longer arm constituting the shank, and the shorter arm the blade of the trimming knife, said blade overhanging the slitting blade, and having a cutting edge substantially at right angles with the cutting edge of the slitting blade, and an inclined lower end which conforms to the beveled face of the slitting blade, the length of the shorter arm in a direction transverse of the slitting knife exceeding the thickness of the longer arm or shank, the shanks of the two knives being adjustably connected to permit an adjustment of the trimming blade toward the slitting blade.

3. A sole channeling tool comprising a slitting knife composed of a shank and a thin extension formed as a blade at one end of the shank, and a trimming knife composed of two arms bent substantially at right angles with each other and forming a shank and a blade, and formed with a recess adjacent to the angle of the two arms, one of said arms extending transverse of the slitting knife, the cutting edges of the two knives being substantially flush with each other.

In testimony whereof I have affixed my signature, in presence of two witnesses.

MILLER COOK, JR.

Witnesses:
  E. BATCHELDER,
  ARTHUR H. BROWN.